June 5, 1945.                J. A. POTTER ET AL                2,377,370
                                VOLTAGE REGULATION
                              Filed Nov. 25, 1942
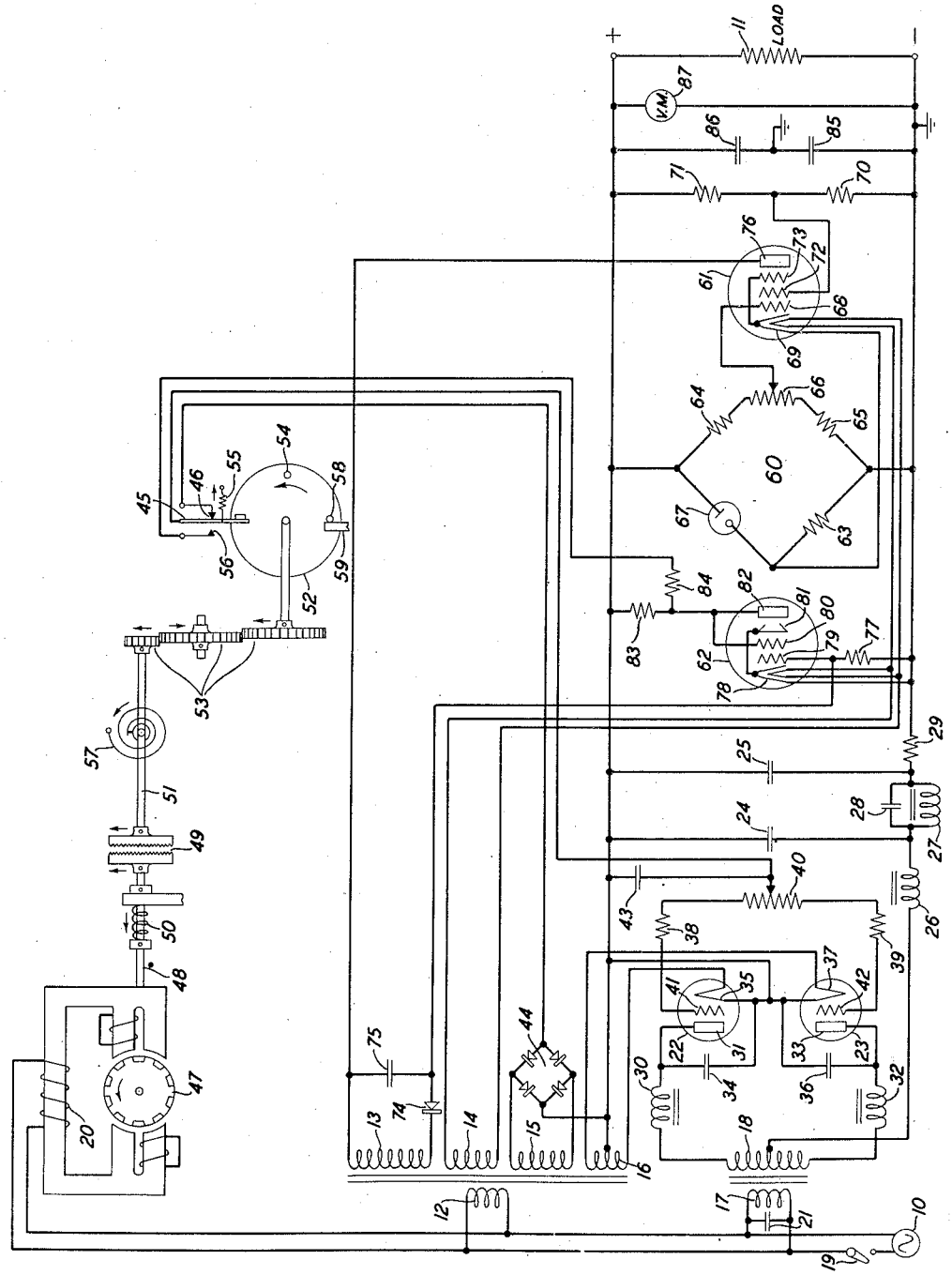
INVENTORS
J. A. POTTER
D. E. TRUCKSESS
BY
C. M. Sprague
ATTORNEY Patented June 5, 1945

2,377,370

UNITED STATES PATENT OFFICE 2,377,370

VOLTAGE REGULATION

James A. Potter, Rutherford, and David E. Trucksess, Summit, N. J., assignors to Bell Telephone Laboratories, Incorporated, New York, N. Y., a corporation of New York Application November 25, 1942, Serial No. 466,860

4 Claims. (Cl. 175—363)

This invention relates to voltage regulation and particularly to a regulated rectifier for supplying direct current at substantially constant voltage to a load.

In accordance with an embodiment of the invention herein shown and described for the purpose of illustration, there is associated with a load circuit connected to an alternating current rectifier a regulator tube or electric discharge device having a space current path the resistance of which is varied in accordance with load voltage variations for limiting the amplitude of the variations in load voltage. The output voltage of the rectifier is caused to vary in response to a sustained, unidirectional change of load voltage for maintaining the average load voltage and, therefore, the average space current through the regulator tube at a substantially constant value, the space current being maintained preferably at about the mid-point of its operating range.

A full wave rectifier comprising two grid controlled gas-filled electric discharge devices rectifies current from an alternating current source and supplies the rectified current to a load through a circuit having series inductive and shunt capacitive filter elements, this circuit also including resistance in series with respect to the load. The space current path of the regulator vacuum tube and a resistor in series therewith are connected in shunt with respect to the load, the voltage drop across said resistor being impressed through a low-pass filter circuit upon the control electrode-cathode circuit of the rectifier tubes. Thus when there occurs, for example, an increase in load voltage of sufficient duration, the biasing potential applied to the rectifier tubes is changed to cause a decrease in voltage at the rectifier output. The average load voltage and the average space current through the regulator tube are thus maintained substantially constant.

The output of the rectifier is thus varied to substantially eliminate slow variations in load voltage, for example, variations of a frequency less than one or two cycles per second, higher frequency variations in load voltage being substantially eliminated due to the action of the shunt regulator circuit. In tests made on a regulated rectifier circuit constructed in accordance with the invention, the output voltage was maintained at 300 volts±½ volt when the load varied from 0.4 ampere to 1.2 amperes or when the alternating supply voltage varied from 108 volts to 126 volts.

The single figure of the drawing is a diagrammatic view of a regulated rectifier which is constructed in accordance with the invention.

Referring to the drawing, there is disclosed a regulated rectifier which is energized by current from a 115-volt, 60-cycle source 10 for supplying direct current to a load 11 while maintaining the voltage across the load substantially constant at 300 volts irrespective of changes of load, changes in voltage or frequency of the alternating current source or other variations such as changes in arc drop of the gas-filled rectifier tubes. When switch 19 is closed, current from the alternating current source 10 is supplied to the primary winding 12 of a transformer having secondary windings 13, 14, 15 and 16, to the primary winding 17 of a transformer having a secondary winding 18, and to the field winding 20 of an inductor type synchronous motor switch somewhat similar to that disclosed in United States Patent 2,152,704 to R. F. Massonneau, April 4, 1939. A 4-microfarad condenser 21 connected across the alternating current supply line suppresses telephone interference and radio frequencies from the rectifier to the supply line and improves the power factor.

A full wave rectifier comprising a pair of grid controlled gas-filled rectifier tubes 22 and 23 supplies pulsating unidirectional current to a filter circuit for attenuating the alternating components comprising shunt condensers 24 and 25, a series retardation coil 26, and a series retardation coil 27 having a condenser 28 connected in shunt therewith. The output of the filter is connected through a 15-ohm resistor 29 to the load 11. One terminal of transformer secondary winding 18 is connected through retardation coil 30 to the anode 31 of tube 22 and the opposite terminal of winding 18 is connected through retardation coil 32 to the anode 33 of tube 23. A condenser 34 of .01 microfarad is in a circuit connecting the anode 31 and cathode 35 of tube 22 and a similar condenser 36 is in a circuit connecting anode 33 and cathode 37 of tube 23. The cathode 35 is supplied with heating current from one-half of the secondary transformer winding 16 while the other half of the winding 16 supplies heating current to cathode 37, the mid-tap of the transformer winding being connected to the positive load terminal. A mid-tap of transformer secondary winding 18 is connected through retardation coils 26 and 27 and resistor 29 to the negative load terminal which is grounded. Coils 30 and 32 and condensers 34 and 36 together with electrostatic shields provided for the transformers serve to reduce the radiation of radio interference generated in the rectifier tubes. Resistors 38 and 39 each of 50,000 ohms and a potentiometer 40 of 0.2 megohm are in a series circuit connecting the grid 41 of tube 22 and the grid 42 of tube 23.

The output voltage of the rectifier 22, 23 tends to increase as the load decreases, for example. A compensating effect may be introduced by making the control electrodes or grids 41 and 42 more negative with respect to the cathodes as the load is decreased. However, the operating range over which the output of the rectifier may be varied in this manner is limited by the fact that maximum output is obtained when anode current flows through each of tubes 22 and 23 during one-half cycle of the alternating current source 10 and minimum output is obtained when anode current flows through each of the rectifier tubes during one-quarter cycle of the alternating current source 10. To extend the range of voltage which may be obtained in this manner from the output of the filter connected to the rectifier, the retardation coil 26 is preferably of the type disclosed in application Serial No. 466,856, filed November 25, 1942, of A. Majlinger and B. E. Stevens. A retardation coil of this type which was used has an inductance of about 10 henries at minimum load and 0.8 henry at maximum load. Without varying the grid voltage of rectifier tubes 22 and 23 the change in voltage across filter condensers 24 and 25 with respect to change in load would be reduced due to the change in inductance of retardation coil 26. Even at maximum load current, however, the retardation coil 26 has sufficient inductance to function effectively as a filter element for alternating harmonics of the rectified current.

In United States Patent 2,235,491 to D. E. Trucksess, March 8, 1941, there is disclosed an arrangement for preventing the flow of anode current in gas-filled rectifier tubes while the cathodes are below normal operating temperature. In the regulated rectifier in accordance with the present invention, means of this general type are provided for delaying the flow of anode current in the rectifier tubes 22 and 23 for a period of about fifteen seconds after the closure of switch 19. For interruptions of the alternating current supply source 10 the duration of which is one-half to two and one-half seconds, the delay introduced by this apparatus is less than fifteen seconds and for interruptions of less than one-half second, no delay is introduced. For preventing the flow of anode current in rectifier tubes 22 and 23 for a period immediately after switch 19 is closed, the grids 41 and 42 of the rectifier tubes are biased approximately 25 volts negatively with respect to cathodes 35 and 37 due to the potential to which condenser 43 is charged by current from copper-oxide rectifier 44 which is energized by current from secondary transformer winding 15, this rectifier being connected across condenser 43 by a circuit which is completed through switch lever 45 and switch contact 46 of a motor operated switch which will now be described. When the winding 20 of the inductor type motor is energized due to the closing of switch 19, the rotor 47 is magnetically pulled into alignment with the pole-pieces to cause the shaft 48 secured thereto to be moved in a direction to cause the engagement of clutch 49 and the rotor is caused to rotate, the spring 50 being compressed due to the movement of the shaft. The shaft 51 which is coupled to shaft 48 through clutch 49 is thus caused to rotate and drive the disc member 52 through the reduction gears 53. The rotation of shaft 51 also winds up a spiral spring 57, one end of which is secured to the shaft, to cause energy to be stored therein. The rotation of the disc 52 through about 90 degrees in a direction indicated by the arrow causes a pin 54 secured to the disc to engage the switch arm 45 and move it, against the tension of spring 55, out of engagement with contact 46 and into engagement with contact 56. The 25-volt negative biasing potential for grids 41 and 42 is thus removed and anode current is permitted to flow through the rectifier tubes 22 and 23. The resultant load on the synchronous motor causes it to stall. If the switch 19 is subsequently opened (or if there is a power failure), the spring 57 drives the disc 52 in the reverse direction to bring a stop pin 58 against a stop 59, the time required for the pin 58 to reach the stop 59 being about three seconds, and switch contact 46 is closed due to the tension of spring 55 when pin 54 moves out of engagement with switch lever 45. If the power is restored before the stop pin 58 reaches stop 59, a period less than fifteen seconds is required for bringing the switch lever 45 out of engagement with contact 46. When the duration of the power failure is less than one-half second no delay is introduced.

Compensation for variations in load voltage is provided by means of a voltage regulator circuit comprising a bridge circuit 60, direct current amplifier 61 and shunt regulator vacuum tube 62. There is also provided a biasing circuit for the grids of rectifier tubes 22 and 23 for controlling the rectifier output to maintain the average load voltage substantially constant.

The bridge circuit 60 comprises resistors 63, 64 and 65, a potentiometer 66 and a cold cathode tube 67 the voltage drop across which remains substantially constant irrespective of the current flowing through it within its operating range. The input corners of the bridge comprising respectively the common terminal of the resistors 63 and 65 and the common terminal of resistor 64 and tube 67 are connected in shunt with the load 11, and the galvanometer corners of the bridge are connected respectively to the control grid 68 and the cathode 69 of amplifier tube 61. Potentiometer 66, the variable tap of which is connected to grid 68, may be adjusted so that the grid 68 is biased about 1½ volts negatively with respect to cathode 69. As the load voltage, and therefore the current through the bridge circuit 60, increases, for example, the resistance of tube 67 decreases so that the voltage drop across it remains substantially constant. The increase in voltage drop across resistor 63 due to an increase in load voltage is greater than the increase in voltage drop across the arm of the bridge consisting of resistor 65 and a portion of the resistance of potentiometer 66 and, therefore, the grid 68 is made more negative with respect to the cathode 69. The potential dividing resistors 70 and 71 in series are connected in a shunt circuit with respect to the load 11 and the common terminal of the resistors is connected to screen grid 72 of tube 61 to bias it 170 volts positive with respect to ground or 20 volts positive with respect to the cathode 69 and suppressor grid 73 which are 150 bolts positive with respect to ground. Anode current is supplied to tube 61 by current from transformer winding 13 which is rectified by half-wave selenium rectifier 74 and filtered by condenser 75. The anode current circuit may be traced from the positively charged plate of condenser 75 to the anode 76 of tube 61, cathode 69, resistor 63 and resistor 77 to the negatively charged plate of condenser 75. In this circuit, the voltage drop across resistor 63 due to the load voltage applied to the bridge circuit 60 is in opposition to the voltage to which condenser 75 is charged. The resulting anode voltage is about 45 volts.

The shunt regulator tube 62 is a beam power tube used as a triode and it comprises a cathode 78, control grid 79 screen grid 80, beam forming plate 81 and anode 82, the screen grid and anode being conductively connected. The voltage drop across resistor 77 due to the anode current of tube 61 flowing through the resistor is impressed across the grid cathode circuit of tube 62, the negative terminal being connected to the grid. The screen grid 80 and anode 82 are connected through resistor 83 to the positive terminal of the load voltage and the cathode is connected to the grounded negative terminal. When switch contact 56 is closed, the voltage drop across resistor 83 is impressed upon the grid-cathode circuits of the rectifier tubes 22 and 23 through a low pass filter circuit comprising resistor 84 and condenser 43, the positively charged terminal of condenser 43 being connected to the cathodes 35 and 37 and the negatively charged terminal being connected to the variable tap of potentiometer 40 which is in a circuit connecting grids 41 and 42. This filter circuit substantially suppresses alternating components of the voltage drop across resistor 83 having a range of frequencies of about 1 cycle per second and higher so that only relatively slow variations of the voltage drop across the resistor 83 are effective to change the grid bias of rectifier tubes 22 and 23 to increase or decrease the rectifier output. Condensers 85 and 86 in series are in a circuit connected in shunt to the load and have their common terminal grounded. This circuit provides a low impedance path for shunting to ground high frequencies picked up by the load 11 or the leads connected thereto. The voltmeter 87 is provided for measuring the load voltage.

In setting up the apparatus for operation the load voltage may be adjusted to a desired value by manually varying the setting of the variable tap of potentiometer 66. Changing this setting varies the grid bias of tube 61 to change its anode current and therefore the voltage drop across resistor 77. As a result the grid bias of tube 62 is changed to increase or decrease the anode current thereof and the voltage drop across resistor 83. A change in average voltage drop across the resistor 83 in turn causes a change in the grid bias of rectifier tubes 22 and 23 to vary the rectifier output and thus the average load voltage. The variable tap of potentiometer 40 may be changed to change the grid bias of one of tubes 22 and 23 with respect to grid bias of the other and, therefore, to make the anode currents of the two tubes approximately equal.

After the above manual adjustments have been made, the load voltage is automatically maintained substantially constant. Let it be assumed, for example, that the load voltage increases for an instant. The negative control grid bias of amplifier tube 61 increases to reduce its anode current and therefore the voltage drop across resistor 77. The negative control grid bias of shunt regulator tube 62 is thus decreased to cause the anode current of tube 62 to increase. The path through which this increased anode current flows may be traced from the cathodes of rectifier tubes 22 and 23 through resistor 83 to the anode 82 and from the cathode 78 through resistor 29, inductance elements 27 and 26 to the center tap of secondary transformer winding 18 of the rectifier circuit. The voltage drop across resistor 29 is thus increased to oppose the increase in load voltage. It is seen therefore that a change in load voltage is opposed by a compensating change in voltage drop across the resistor 29 and the load voltage is therefore maintained at a substantially constant value. Of course, actual change in load voltage must occur in order to effect the desired compensating action but the maximum change in load voltage is limited to a small value say ±0.2 per cent of the load voltage. If for some reason the voltage at the output terminals of filter 24, 25, 26, 27, 28 increases for an instant while the load 11 is fixed, the anode-cathode resistance of tube 62 is decreased and increased current will flow through resistor 83, through the space current path of tube 62 and resistor 29, but the current through the load will remain substantially unchanged. If, on the other hand the output voltage of the filter is fixed and the load current is decreased for an instant the current through the shunt regulator tube is increased correspondingly to substantially prevent a change in current through resistor 29 and therefore a change in load voltage. It will be observed that the regulating circuit comprising electron discharge tubes 61 and 62 can function to maintain the output voltage substantially constant irrespective of load variations and rectifier output voltage variations only so long as the anode current of regulator tube 62 can be caused to vary over a sufficient range to compensate for these variations. If the output voltage of the rectifier increases a certain amount and then returns to its original value within a relatively short period, say, one second, the load voltage will increase by an amount which is small with respect to the increase in rectifier output voltage and then return to its normal value and the anode current through regulator tube 62 will increase by a considerable amount and then return to its average value. Thus alternating components are substantially eliminated from the load voltage by limiting their amplitude to a value which is small with respect to the load voltage. If, however, the output voltage of the rectifier were increased for a longer period, the slightly increased load voltage would also be sustained for a longer period. It is desirable to eliminate changes in average load voltage, since, if allowed to occur, the average anode current of regulator tube 62 might increase or decrease to such an extent that the regulator circuit would not thereafter function to limit the variations in load voltage to a small amplitude. For eliminating from the load voltage variations in average voltage, there is impressed upon the grid-cathode circuits of rectifier tubes 22 and 23 the average voltage drop across resistor 83, the more rapid changes of the voltage drop being suppressed by the low-pass filter circuit comprising resistor 84 and condenser 43. Thus, when there occurs, for example, a slight rise in load voltage of relatively long duration, say one second, the resulting increased anode current of regulator tube 62 causes an increase in voltage drop across resistor 83 of long duration. As a result the grids of rectifier tubes 22 and 23 are biased more negatively to decrease the voltage output from the rectifier and from the output terminals of filter 24, 25, 26, 27, 28 and, therefore, a rise in average load voltage and an increase in average anode current of regulator tube 62 is prevented. If the average bias of the rectifier tube control grids were not changed in response to a small increase in load voltage of long duration and the output voltage of the rectifier were permitted to continuously increase at a slow rate, for example, the average anode current of the regulator tube would increase to its maximum operating value and therefore the load voltage would increase beyond a small initial increase. The circuit arrangement for controlling the bias of the control grids of the rectifier tubes functions to limit the duration of an increase or decrease in load voltage to a period of about one second.

What is claimed is:

1. A regulated rectifier for supplying direct current at substantially constant voltage to a load comprising rectifying means for rectifying current from an alternating current source, a circuit for transmitting direct current from said rectifying means to said load, said circuit comprising a filter for attenuating alternating components of said current and resistance means connected in series with said load and said filter, an electron discharge device having a space current path connected in shunt circuit with respect to said load, means for causing the resistance of said space current path to vary in accordance with load voltage variations for producing across said resistance means a voltage for counteracting said variations, and means responsive to current variations in said space current path for controlling said rectifying means to maintain said space current within a predetermined amplitude range.

2. In combination, means for rectifying current from an alternating current source, a filter comprising inductive and capacitive elements for attenuating alternating components of the current from said rectifier, a circuit comprising resistance for connecting the output of said filter to a load, an electric discharge device having an anode, a cathode and a control electrode, a current path connected in shunt with respect to said load and including the anode-cathode path of said electric discharge device, means for impressing upon the control electrode-cathode path of said electric discharge device a voltage which varies in response to load voltage changes for controlling the anode current of said device, and means responsive to relatively low frequency components of the anode current of said electric discharge device for controlling said rectifying means to vary its output voltage and thereby maintain the average value of said anode current substantially constant.

3. A regulated rectifier comprising means for rectifying current from an alternating current source including a gas-filled rectifier tube having an anode, a cathode and a control electrode, a circuit through which said rectified current is supplied to a load, said circuit comprising resistance in series with respect to the load and a low-pass filter having inductive and capacitive elements, a source of voltage derived from and varying with the voltage across said load, a vacuum tube amplifier for amplifying the voltage of said source, an electric discharge device having an anode, a cathode, and a control electrode, means for impressing said amplified voltage upon the control electrode-cathode path of said electric discharge device to control the anode current thereof, a current path connected in shunt with respect to said load and comprising a first resistor and the anode current path of said electric discharge device in series, and means for impressing relatively low frequency components of the voltage drop across said first resistor upon the control grid-cathode path of said rectifier tube to control the anode current of said rectifier tube, said means comprising a second resistor and a condenser in series connected across the terminals of said first resistor, and means for conductively connecting the plates of said condenser to the grid and cathode of said rectifier tube, respectively.

4. In combination with rectifying means having a space current path for rectifying current from an alternating current source and a control means upon which a voltage may be impressed for controlling the flow of rectified current through said space current path, a circuit for supplying rectified current from said rectifier to a load, a filter in said circuit for attenuating alternating components of the current from said rectifier, an electronic device having an anode, a cathode and a control electrode, means for limiting to a small value the amplitude of load voltage changes comprising a current path in shunt with said load having connected therein in series a first resistor and the anode-cathode path of said electronic device and means for impressing upon the control electrode-cathode circuit of said device a voltage which varies in response to load voltage changes, a second resistor and a condenser connected in a series circuit including said first resistor to cause said condenser to be charged due to the voltage drop across said first resistor and means for connecting said condenser to the control means of said rectifier for controlling the output current of said rectifier and thereby maintain the current of said shunt path within a desired operating range of anode-cathode current of said electronic device.

JAMES A. POTTER.
DAVID E. TRUCKSESS.